455-606
2/23/82

AU 233 EX
OR 4,317,232

British
2043882

United States Patent [19]

Pickett et al.

[11] 4,317,232
[45] Feb. 23, 1982

[54] FIBER OPTIC SIGNAL CONDITIONING CIRCUIT

[75] Inventors: Terence D. Pickett, Waterloo; Charles W. Formwalt, Jr., Cedar Falls, both of Iowa

[73] Assignee: Deere & Company, Moline, Ill.

[21] Appl. No.: 2,845

[22] Filed: Jan. 12, 1979

[51] Int. Cl.³ .............................................. H04B 9/00
[52] U.S. Cl. ................... 455/606; 307/311; 372/43
[58] Field of Search .............. 250/211 J, 199; 307/311; 332/7.51; 331/94.5 H, 94.5 M; 357/19; 455/606

[56] References Cited

U.S. PATENT DOCUMENTS

| | | | |
|---|---|---|---|
| 3,879,687 | 4/1975 | Daehlin et al. | 332/7.51 |
| 3,952,265 | 4/1976 | Hunsperger | 250/199 |
| 4,051,363 | 9/1977 | Fish | 250/199 |
| 4,056,719 | 11/1977 | Waaben | 307/311 |
| 4,070,572 | 1/1978 | Hayes | 250/199 |
| 4,096,382 | 6/1978 | Numata et al. | 307/311 |
| 4,168,427 | 9/1979 | Hubbard | 455/606 |

FOREIGN PATENT DOCUMENTS 2000373  1/1979  United Kingdom ................. 357/19

OTHER PUBLICATIONS

Adlerstein-Optical Communcations, Computing GGT A Semiconductor Boost at SPIE-Electronic Design 17-Aug. 16, 1978, pp. 30, 40, 41.
Mims-Communicate Over Light Beams With the First Single LED Transceiver-Pop. Elect., Mar. 1974, pp. 66-70.
Mims-LED Circuits and Projects-Published by H. W. Sams, 1975.
Grundy et al., Collector Diffusion Isolation Packs Many Functions on a Chip-Electronics-Jul. 3, 1972, pp. 96 and 104.
Ramsay et al., Subsystems for Optical Fibre Communication Field Demonstrations-Proc. of Ire-vol. 123, #6, pp. 633-641, Jun. 1976.
Mortensen-Low Cost Optical Sensor Overcomes Ambient Light-Electronics-Jun. 12, 1975, p. 124.

Primary Examiner—Joseph A. Orsino, Jr.

[57] ABSTRACT

A circuit for both transmitting and receiving information in the form of light energy using a single light-emitting diode. Signals are received by the diode from a fiber optic light pipe or bundle and are converted into electrical energy. A transmission section in the same circuit converts electrical energy into light energy in the diode to transmit information. The system, therefore, requires only one diode and one optical connector at each end of the light pipe or bundle for two-way communications.

21 Claims, 1 Drawing Figure

FIBER OPTIC SIGNAL CONDITIONING CIRCUIT

BACKGROUND OF THE INVENTION

The present invention relates to an optical data link and more particularly to a circuit which incorporates a single light-emitting diode for both transmitting and receiving information.

Fiber optic technology has resulted in the extensive use of fiber optic light pipes or bundles for transmitting data. The information to be transmitted is converted from electrical energy to light energy which is then transmitted through a fiber optic bundle to a receiver where the light energy is converted into electrical energy. Fiber optic bundles are chosen for data links rather than shielded cable for numerous reasons including noise immunity from electromagnetic interference and high transmission speed. Compared with shielded cable, fiber optic bundles have increased strength and flexibility, higher reliability, and fewer connector problems associated with low level signals.

For light communications between two or more locations, a transmitting device, such as a light-emitting diode (LED), and a separate light receiving device are used for converting between light and electrical energy. Often a different fiber optic bundle is used for transmitting in one direction than is used for transmission in the opposite direction. Two optic couplers are required at each location, one for coupling the LED light output to a bundle and one for coupling the light from the bundle to the receiver processing circuitry. If a single fiber optic bundle or pipe is used, each end of the bundle or pipe is usually split to facilitate coupling to the separate transmitting and receiving devices in the circuitry at each location. Using the separate transmitting and receiving devices increases the number of optical couplers and, often, the number of fiber optic bundles required for a data link, resulting in the increase of bulk and cost of the system.

Attempts to provide a conditioning circuit with a single solid state device to both transmit to and receive information from a light transmitting media, such as a fiber optic bundle, have heretofore generally been unsuccessful. Semiconductor devices which provide an adequate light output for transmission usually have a very low current output upon receipt of a light signal. Problems of stability have been encountered because the input upon receipt of light is generally very low. The input offset current of the amplifier used is an important limiting factor. The low input signal also requires a very high gain amplifier with good stability characteristics. In addition, the input amplifier must have a high slew rate to provide an adequate bandwidth for transmission of the signals.

SUMMARY OF THE INVENTION

A circuit is necessary which overcomes the aforementioned problems to both transmit and receive information using a single solid-state device.

It is, therefore, an object of the present invention to provide a circuit for both transmitting and receiving light signals using a single semiconductor device coupled to the light transmitting medium.

It is a further object of the present invention to provide a fiber optic signal conditioning circuit using only one light-emitting diode to both transmit and receive data.

It is still another object of the present invention to provide a fiber optic signal conditioning circuit for both transmitting light information to and receiving light information from a fiber optic light pipe or bundle which requires only a single optical coupling device.

These and other objects and advantages of the present invention will become apparent from the following description when taken in conjunction with the accompanying drawing, FIG. 1, a detailed schematic diagram for a circuit in accordance with the present invention.

DESCRIPTION OF THE PREFERRED EMBODIMENT

Figure 1:
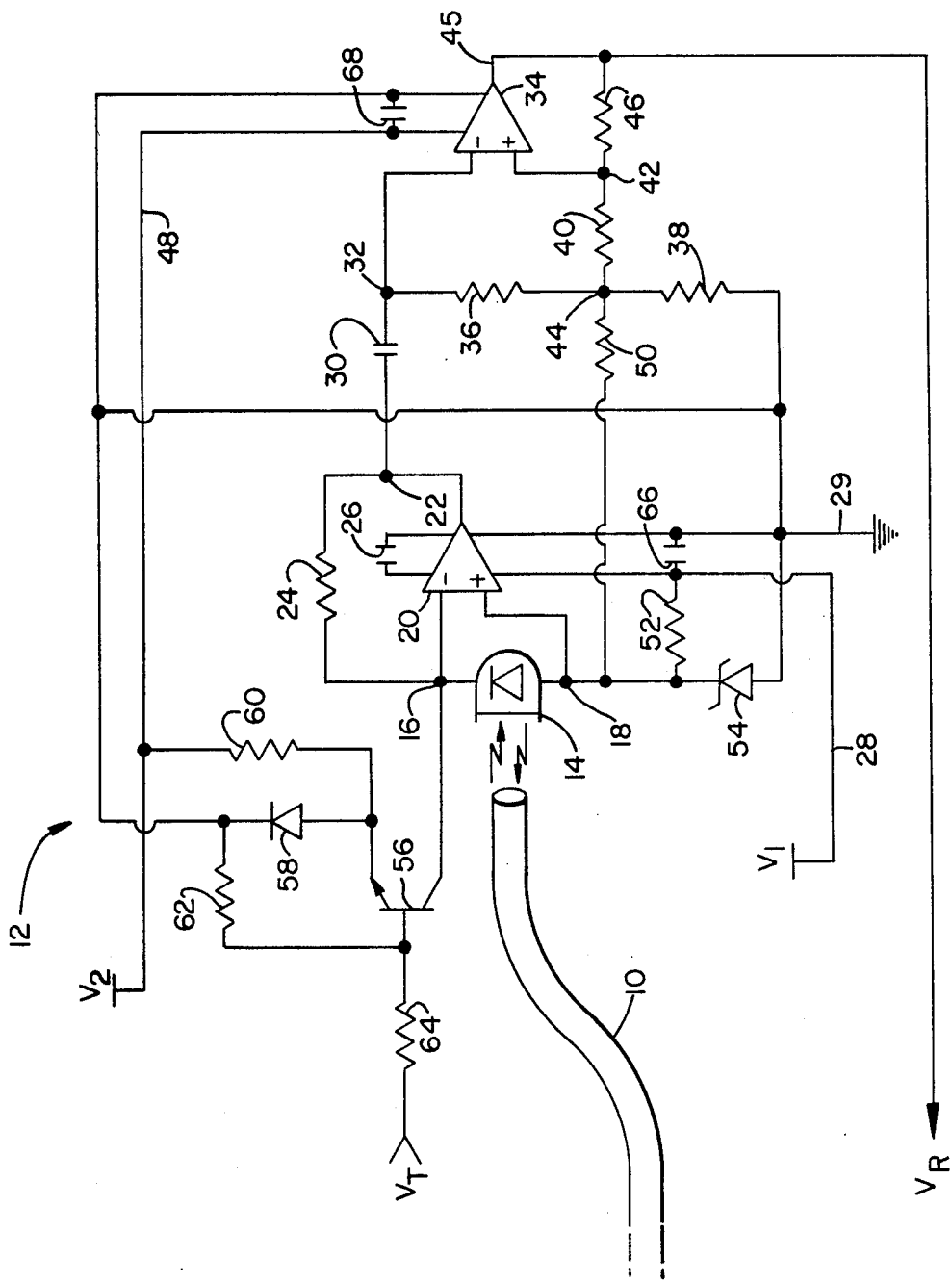

A fiber optic bundle or light pipe is indicated generally at 10 for transmitting light signals in either direction between a transmitter-receiver circuit, or signal conditioning circuit 12 at one end of the bundle and a similar device at the other end. The conditioning circuit 12 includes a single light-emitting diode (LED) 14 optically coupled to the fiber optic bundle 10. A conventional optical coupling device can be used.

The LED 14 is connected between terminals 16 and 18 of the circuit which are in turn connected to the negative and positive input terminals, respectively, of an operational amplifier 20. Preferably the amplifier 20 is a bi-fet operational amplifier having a very high input impedance and low differential input current, as well as a high slew rate. Connected between the output terminal 22 and the negative input of amplifier 20 is a feedback resistor 24. A capacitor 26 provides stabilization for the amplifier 20. Power is supplied to the amplifier over line 28 which is connected to power source V1. The circuit 12 is grounded through lead 29.

The output terminal 22 is connected through a coupling capacitor 30 to the negative input terminal 32 of a comparator 34. The negative input terminal 32 is connected to ground through series resistors 36 and 38, and a resistor 40 connects the positive input terminal 42 of the comparator 34 with a terminal 44 between the series resistors. The output terminal 45 of the comparator 34 is connected to the positive input 42 through a resistor 46. A line 48 connects the comparator 34 with a power source V2. A resistor 50 is connected between the terminal 44 and the terminal 18. The terminal 18 is connected through a resistor 52 to the power line 28. A Zener diode 54 is connected between the terminal 18 and ground.

The collector of an NPN transistor 56 is connected to the terminal 16. The emitter of the transistor 56 is connected through a diode 58 to ground. A resistor 60 also connects the emitter with the power line 48. A resistor 62 connects the base of the transistor 56 to ground. The base is also connected through a resistor 64 to the input terminal Vt. A capacitor 66 is connected between the power line 28 and ground, and a capacitor 68 is connected between the power line 48 and ground to provide filtering for the lines.

For discussing the operation of the transmit mode of the signal conditioning circuit 12, assume initially that there is no modulating voltage present at the input terminal Vt. Zener diode 54 maintains the level of the voltage at terminal 18 at a level below the voltage on the supply line 28, preferably about 3.8 volts. Essentially no current is flowing in the light-emitting diode 14 so that the terminal 16 is at approximately the same voltage. The resistor 62 maintains the base of the transistor 56 at or near ground and no current flows from the collector to the emitter. A positive transmit signal supplied to the input terminal Vt causes the transistor 56 to turn on, drawing current from the terminal 18 through the LED 14 and through the transistor 56 and diode 58 to ground. The current through the LED 14 is thus switched by the transistor 56 as the input signal at Vt varies to modulate the light output from the LED. The varying light output is coupled to the fiber optic bundle 10 for transmission to a receiver at the opposite end of the bundle.

For operation in the receive mode, assuming initially that no light is incident on the LED from the bundle 10, the positive input terminal 18 of the operational amplifier 20 is held at the Zener voltage of about 3.8 volts. There is essentially no current flowing through the LED at this point and the negative input terminal 16 of the amplifier 20 will be at approximately the same level as the positive input terminal 18. The output level at terminal 22 is approximately the same also. The positive and the negative input terminals of the comparator 34 are coupled through the resistors 40 and 36 to the terminal 44 which is held at a voltage level below the Zener voltage at terminal 18 by the voltage divider consisting of resistors 50 and 38 connected between terminal 18 and ground. The positive and negative terminals of the comparator 34 are thus kept at the same level, and the resistor 46 provides hysterises to avoid oscillation. Assuming initially that the output 45 of the comparator 34 is at a low level, the output will remain low until a negative signal is coupled through the capacitor 30 to the negative input 32.

When light from the bundle 10 is transmitted to the junction of the LED 14, current flows from terminal 16 to terminal 18. Therefore, terminal 16 is at a slightly higher voltage than terminal 18 which results in a decrease in voltage at the output terminal 22. The descrease in voltage is determined by the amount of light incident on the LED 14 and by the gain of the circuity which is dependent on the feedback resistor 24. The resulting decrease in voltage at the output terminal 22 is coupled through the capacitor 30 to the negative input terminal 32 of the comparator 34. The output level on line 45 goes toward the high, or logic 1 level, indicating receipt of a logic signal over the bundle 10. When light is no longer received at the LED 14, the terminal 16 returns to approximately the same level as terminal 18 and the output at terminal 22 increases to its steady-state level. This increase in voltage is coupled from the terminal 22 through the capacitor 30 to the negative input of the comparator 34, and the level at the output 45 returns to the low, or logic 0 level.

The resistor 60, which is connected between the power supply V2 and the emitter of the transistor 56, and the diode 58 provide reverse-biasing for the transistor 56 during the receive mode. This biasing assures that there is minimal leakage current flowing through the transistor 56 while the circuit is operating in the receive mode.

In the embodiment shown, the V1 supply voltage is maintained at a level of approximatey 8 volts and the V2 level is maintained at approximately 5 volts. The circuit is particularly useful for data links on mobile equipment since it may be operated from a single positive supply, such as a 12 volt battery commonly found on the mobile equipment.

A list of components for the preferred embodiment follows:

| Resistors | |
| --- | --- |
| 24 | 5.1 Meg |
| 36,40 | 20K |
| 38,50 | 2.2 K |
| 46,60 | 1.1 Meg |
| 52 | 120 |
| 62,64 | 1.5 K |
| Capacitors | |
| 26 | 10₁f |
| 30 | 0.1uf |
| 66,68 | .02uf |
| Integrated Circuits | |
| 20 | CA 3160 |
| 34 | 74 C 909 |
| Diodes | |
| 14 | LED 55 CF |
| 54 | 1N4729 |
| 58 | 1N4148 |
| Transistor | |
| MPS 3392 | |

The circuit 12 is matched to the single light-emitting diode 14 so that it is effective to transmit information in the form of light to, as well as receive information from the pipe or medium 10. As is obvious from the above description, the invention reduces the number of optical connectors and fiber optic bundles or light pipes and greatly simplifies implementing an optical data link between locations, decreasing the expense and bulk of the system while increasing its reliability.

We claim:

1. In a data transmission system capable of high speed data communication including a medium for transmitting signals in the form of light, a circuit selectively alternating between transmit and receive modes for receiving the light signals and converting them to electrical signals and for producing light signals from a source of electrical transmit signals and transmitting said light signals through the medium, the circuit comprising:

a single light emissive semiconductor element optically coupled to the medium and including a pair of terminals, the element producing a light output when a current of a first polarity is provided between the terminals and alternately producing an output current flow between the terminals when the light signals impinge upon the element; and circuit means connected to the element terminals for producing the light transmission signals from the electrical transmit signals and, alternately, the electrical signals from the received light signals, said circuit means comprising:

an amplifier having a pair of inputs connected to the respective terminals during both the transmit and receive modes of circuit operation and responsive to the output current flow during the receive mode to provide an output signal indicative of the light signals received from the medium; and current means connected in series with the semiconductor element during both the transmit and receive modes of circuit operation and responsive to the presence of an electrical transmit signal from the source for automatically selecting the transmit mode of operation and providing the current between the terminals to produce the light signals to be transmitted, wherein in the absence of an electrical transmit signal from the source the receive mode of operation is automatically selected.

2. The invention defined in claim 1 wherein the semiconductor element comprises a light-emitting diode.

3. The invention defined in claim 1 wherein the amplifier includes an operational amplifier, and wherein the pair of inputs comprise positive and negative input terminals of the operational amplifier.

4. The invention defined in claim 1 or 3 wherein the current means includes a power source connected between one of the element terminals and ground and a transistor connected between the other element terminal and the ground.

5. An optical transmitter-receiver capable of high speed automatic transitions between a receive mode for receiving light signals from a fiber optic light pipe and a transmit mode for coupling light signals to the light pipe, the transmitter-receiver comprising:
- a single light-emitting diode having first and second terminals and optically coupled to the light pipe for producing a light output when a current is passed through the diode and for producing a current output when light signals impinge on the diode;
- first circuit means connected to the diode during both the transmit and receive modes for selectively providing current through the diode to establish the light signals to be transmitted, said first circuit means including a source of current and a high speed electronic switch member operable between an on and an off condition connected in series with the diode; and
- second circuit means connected to the first and second terminals of the diode during both the transmit and receive modes and responsive to the current output when the switch member is in the off condition for producing an electrical signal indicative thereof, wherein when the high speed electronic switch member is in the on condition a light output is produced and the transmitter-receiver operates in the transmit mode and wherein the switching of the switch member from the on to the off condition automatically and immediately changes the transmitter-receiver to the receive mode for receiving a light signal from the light pipe.

6. The invention defined in claim 5 wherein the switch member includes a transistor to regulate the current provided through the diode and means reverse biasing the transistor for preventing current leakage through the transistor when the switch member in the off condition.

7. In a high speed data transmission system including a medium for transmitting signals in the form of light, a circuit operable in a receive mode for receiving the light signals and for converting them to electrical signals and in a transmit mode for producing light signals from electrical signals for transmission through the medium comprising:
- a light emissive semiconductor element optically coupled to the medium and including first and second terminals, the element producing a light output when a current of a first polarity is provided between the terminals and alternately producing an output current flow of an opposite polarity when the light signals are received by the element;
- an operational amplifier having first and second inputs connected to the first and second terminals, respectively, during both the transmit and receive modes of operation, the amplifier having a high input impedance and a low differential input current between the first and second terminals and providing an output signal responsive to the output current flow and indicative of the light signals received from the medium during the receive mode;
- power supply means connected to the second terminal; and
- electronic switch means connected to the first terminal during both modes of operation switchable between an off condition for operating the circuit in the receive mode and an on condition for operating the circuit in the transmit mode whereby in the on condition current of the first polarity flows between the terminals and produces a light output, the switch means including means for preventing current leakage therethrough from the first terminal when in the off condition.

8. The invention defined in claim 7 wherein the operational amplifier includes an output terminal and a feedback resistor connected between the output terminal and the first input, the first and second inputs being the negative and positive input terminals, respectively, of the operational amplifier, and wherein the switch means when in the on condition causes current to flow from the second to the first terminal, and wherein current is caused to flow from the first to the second terminal when the light impinges on the element.

9. The invention defined in claims 7 or 8 further comprising a comparator connected to the amplifier and responsive to the output signal for providing a logic output as light signals are received by the element.

10. The invention defined in claim 9 wherein the comparator includes positive and negative input terminals and an output terminal and wherein the output signal from the amplifier is coupled capacitively to the negative input terminal of the comparator and feedback is provided from the output terminal to the positive input terminal thereby preventing a change in state of the comparator until a change in the output signal from the amplifier occurs.

11. In a data transmission system including a medium for transmitting signals in the form of light, a source of electrical transmit signals, circuit means for receiving light signals and converting them to electrical signals, and for producing light signals to be transmitted through the medium from the electrical transmit signals, said circuit means comprising:
- a light emitting diode (LED) optically coupled to the medium and having first and second terminals;
- a power supply including first and second supply terminals, said first supply terminal connected to the first terminal of the LED;
- a transistor having a collector connected to the second terminal of the LED, a base connected to the source of the electrical transmit signals, and an emitter connected to the second supply terminal;
- means for reverse-biasing the transistor while the circuit means is receiving light signals to prevent leakage current therethrough;
- an operational amplifier having first and second input terminals connected to the first and second LED terminals, respectively, and an output; and
- feedback means connected between the amplifier output and one of the input terminals for limiting the gain of the amplifier.

12. The invention defined in claim 11 wherein the means for reverse-biasing the transistor comprises a voltage source, a resistor connected between the emitter and the voltage source, and a diode connected between the emitter and the second supply terminals.

13. In a data transmission system including a medium fro transmitting signals in the form of light, a circuit for receiving the light signals and converting them to electrical signals and for producing light signals from electrical signals for transmission through the medium, comprising:
a light emissive semiconductor element optically coupled to a medium and including first and second terminals, the element producing a light output when a current of a first polarity is provided between the terminals and alternately producing an output current flow of an opposite polarity when the light signals are received by the element;
an operational amplifier having first and second inputs connected to the first and second terminals, respectively, the amplifier having a high input impedance and a low differetial input current between the first and second terminals and providing an output signal responsive to the output current flow and indicative of the light signals received from the medium;
power supply means connected to the second terminal; and
switch means connected to the first terminal and operable between an off condition, and an on condition whereby in the on condition current of the first polarity flows between the terminals and produces a light output, the switch means including means for preventing current leakage therethrough from the first terminal when in the off condition, said switch means comprising a transistor having its collector connected to the first terminal and its base connected to a source of electrical transmit signals, and wherein the means for preventing current leakage comprises a diode connected in series with emitter of the transistor, a voltage source, and a resistor connecting the emitter to the voltage source to reverse-bias the transistor when the switch means is in the off condition.

14. The invention defined in claim 13 wherein the semiconductor element is a light-emitting diode.

15. In a data transmission system including a medium for transmitting signals in the form of light, a circuit for receiving the light signals and converting them to electrical signals and for producing light signals from electrical signals for transmission through the medium, comprising:
a light emissive semiconductor element optically coupled to the medium and including first and second terminals, the element producing a light output when a current of a first polarity is provided between the terminals and alternately producing an output current flow of an opposite polarity when the light signals are received by the element;
an operational amplifier having first and second inputs connected to the first and second terminals, respectively, the amplifier having a high input impedance and a low differential input current between the first and second terminals and providing an output signal responsive to the output current flow and indicative of the light signals received from the medium;
power supply means connected to the second terminal comprising a positive voltage source; and
wherein the first and second inputs comprise the negative and positive inputs, respectively, of the operational amplifier, wherein the switch means comprises an NPN transistor having its collector connected to the first terminal and its base connected to the source of electrical transmit signals, and wherein the means for preventing current leakage comprises a diode connected between the emitter of the transistor and ground, and a source of voltage connected to the emitter to reverse bias the transistor when in the nonconducting condition.

16. In a data transmission system including a medium for transmitting signals in the form of light, a circuit for receiving the light signals and for converting them to electrical signals and for producing light signals from electrical signals for transmission through the medium, comprising:
a light emissive semiconductor element optically coupled to the medium and including first and second terminals, the element producing a light output when a current of a first polarity is provided between the terminals and alternately producing an output current flow of an opposite polarity when the light signals are received by the element;
amplifier means having first and second inputs connected to the first and second inputs connected to the first and second terminals, respectively, for providing an output signal responsive to the output current flow and indicative of the light signals received from the medium;
a single polarity d-c power supply having a first lead connected to the second terminal, and a ground;
switch means connected to the first terminal and operable between an off condition and an on condition whereby in the on condition current of the first polarity flows between the terminals and produces a light output, the switch means comprising a transistor having its collector connected to the first terminal and its base connected to the source of the electrical transmit signals and including means for preventing current leakage therethrough from the first terminal when in the off condition comprising a diode connected between the emitter of the transistor and ground and a source of voltage connected to the emitter to reverse bias the transistor when in the nonconducting condition.

17. An optical transmitter-receiver capable of high speed automatic transitions between a receive mode for receiving light signals from a fiber optic light pipe and a transmit mode for coupling light signals to the light pipe, the trasmitter-receiver comprising:
a single light-emitting diode having first and second terminals and optically coupled to the light pipe for producing a light output when a current is passed through the diode and for producing a current output when light signals impinge on the diode;
first circuit means connected to the diode during both the transmit and receive modes for selectively providing current through the diode to establish the light signals to be transmitted, said first circuit means including a source of current and a high speed electronic switch member operable between an on and an off condition connected in series with the diode; and
second circuit means connected to the first and second terminals of the diode during both the transmit and receive modes and responsive to the current output when the switch member is in the off condition for producing an electrical signal indicative thereof, wherein when the high speed electronic switch member is in the on condition a light output is produced and the transmitter-receiver operates in the transmit mode and wherein the switching of the switch member from the on to the off condition automatically and immediately changes the trasmitter-receiver to the receive mode for receiving a light signal from the light pipe, wherein said second circuit means comprises amplifier means having two input terminals connected to the first and second terminals, and an output terminal, for producing a change in level at the output terminal when there is a change in the intensity of the light impinging on the diode, and a comparator having input and output ports and a capacitor connected between the output terminal and the input port for providing a signal from the output port upon a change in level at the input port.

18. The invention as set forth in claim 17 wherein the comparator further includes positive feedback means connected beween the output and input ports for providing hysteresis.

19. An optical transmitter-receiver capable of automatic transitions between a receive mode for receiving light signals from a fiber optic light pipe and a transmit mode for coupling light signals to the light pipe, the transmitter-receiver comprising:
a single light-emitting diode having first and second terminals and optically coupled to the light pipe for producing a light output when a current is passed through the diode and for producing a current output when light signals impinge on the diode;
first circuit means connected to the diode during both the transmit and receive modes for selectively providing current to the diode to establish the light signals to be transmitted, said first circuit means including a voltage supply connected to the second terminal, and an electronic switch connected to the first terminal during both the transmit and receive modes of operation and switchable between an on and an off condition;
second circuit means including first and second inputs connected to the first and second terminals, respectively, of the diode during both modes of operation; and
wherein said electronic switch comprises a transistor, and diode means for preventing transistor leakage current through the light-emitting diode when the switch is in the off condition, and wherein when the electronic switch is in the on condition a light output is produced and the transmitter-receiver operates in the transmit mode and wherein the switching of the switch from the on to the off condition automatically changes the transmitter-receiver to the receive mode for receiving a light signal from the light pipe.

20. The invention as set forth in claim 19 wherein the voltage supply includes two supply terminals, and the transistor includes a base connected to a source of transmit signals, an emitter connected to one of the supply terminals, and a collector, wherein the collector is connected via the light emitting diode to the other of said supply terminals so that when a transmit signal is present at the base, a current path is provided between the supply terminals through the light-emitting diode and the transistor.

21. The invention as set forth in claim 20 wherein the emitter is connected via the diode means to said one of the supply terminals.

* * * * *

UNITED STATES PATENT AND TRADEMARK OFFICE
CERTIFICATE OF CORRECTION

PATENT NO. : 4,317,232
DATED : 23 February 1982
INVENTOR(S) : Terence D. Pickett and Charles W. Formwalt, Jr.

It is certified that error appears in the above—identified patent and that said Letters Patent is hereby corrected as shown below:

Column 7, line 4, delete "fro" and insert -- for --.

* Column 8, line 1, delete ", wherein the" and insert --; and -- and begin a new paragraph with "switch"; line 2, delete "comprises" and insert -- comprising --; line 5, delete "wherein the"; line 6, delete "comprises" and insert -- comprising --;

Column 8, lines 23 and 24, delete "connected to the first and second inputs".

Column 9, line 5, delete "tras-" and insert -- trans- --.

Signed and Sealed this

Seventh Day of September 1982

[SEAL]

Attest:

GERALD J. MOSSINGHOFF

Attesting Officer    Commissioner of Patents and Trademarks